United States Patent [19]
Foster

[11] Patent Number: 6,042,456
[45] Date of Patent: Mar. 28, 2000

[54] SUCTION OPERATED VALVE RESURFACING TOOL AND ASSOCIATED METHOD

[76] Inventor: John Foster, HC 81 Box 3314, Searsmount, Me. 04973

[21] Appl. No.: 09/339,079

[22] Filed: Jun. 23, 1999

[51] Int. Cl.⁷ ...................................................... B24B 1/00
[52] U.S. Cl. ............................ 451/51; 451/430; 451/523
[58] Field of Search ...................................... 451/252, 317, 451/319, 323, 430, 557, 558, 36, 523, 524, 542, 49, 51, 217, 540, 548, 550, 439, 440, 415; 408/72 R, 79, 80, 82, 83.5

[56] References Cited

U.S. PATENT DOCUMENTS

| | | | |
|---|---|---|---|
| 2,809,482 | 10/1957 | Soulet | 451/430 |
| 3,184,894 | 5/1965 | Bayes | 451/430 |
| 3,354,528 | 11/1967 | Appleby | 29/105 |
| 4,627,461 | 12/1986 | Gordon | 451/430 |
| 4,637,762 | 1/1987 | Acer | 408/203.5 |
| 5,109,564 | 5/1992 | Horvath | 15/236.06 |
| 5,749,774 | 5/1998 | Foster | 451/430 |
| 5,882,250 | 3/1999 | Foster | 451/430 |

FOREIGN PATENT DOCUMENTS

| 21899 | 8/1929 | Australia | 451/430 |
|---|---|---|---|

*Primary Examiner*—Derris Holt Banks

[57] ABSTRACT

Disclosed is a suction operated valve resurfacing, or lapping, tool and an associated method for its use. In general terms, the tool of the present invention includes a handle portion and a suction generating means. A reciprocating assembly is adapted for travel within the interior of the handle and functions in expelling air out of and drawing air into the handle. Through the use of the suction generating means the tool can be positively secured to the upper surface of a valve. Thereafter, the entire tool can be rotated via the handle to facilitate the resurfacing of the valve seat.

11 Claims, 5 Drawing Sheets

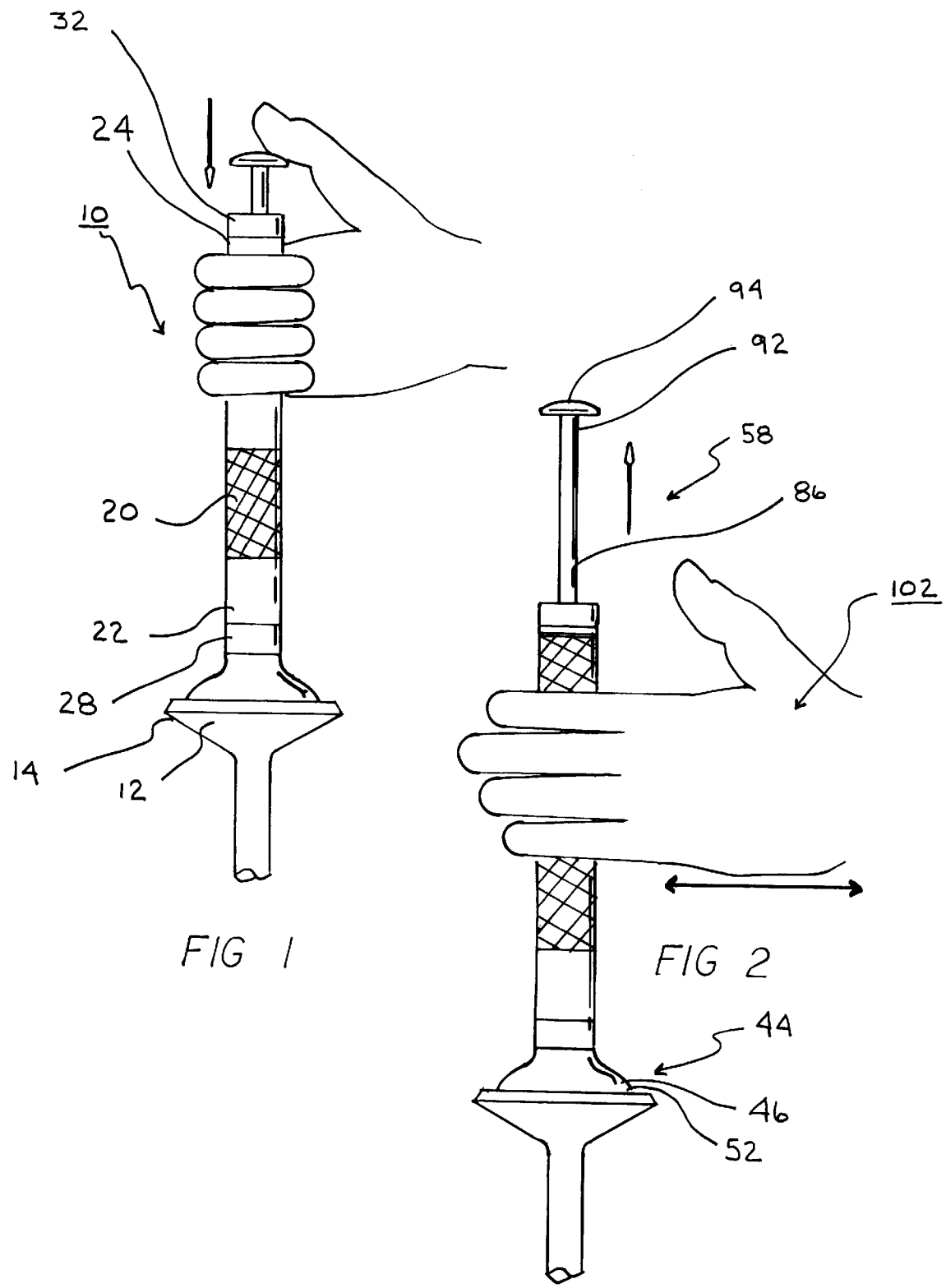

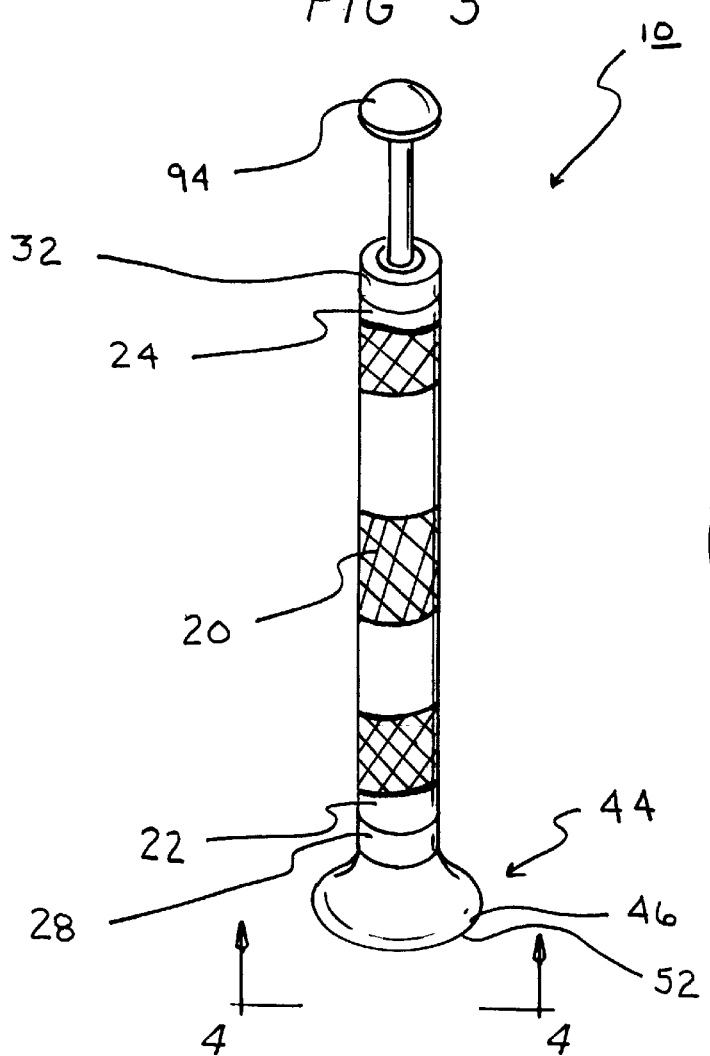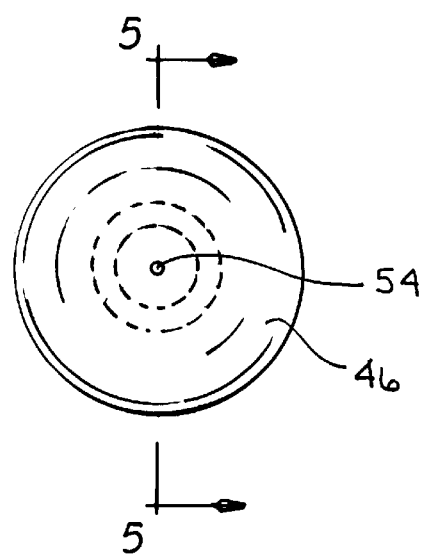

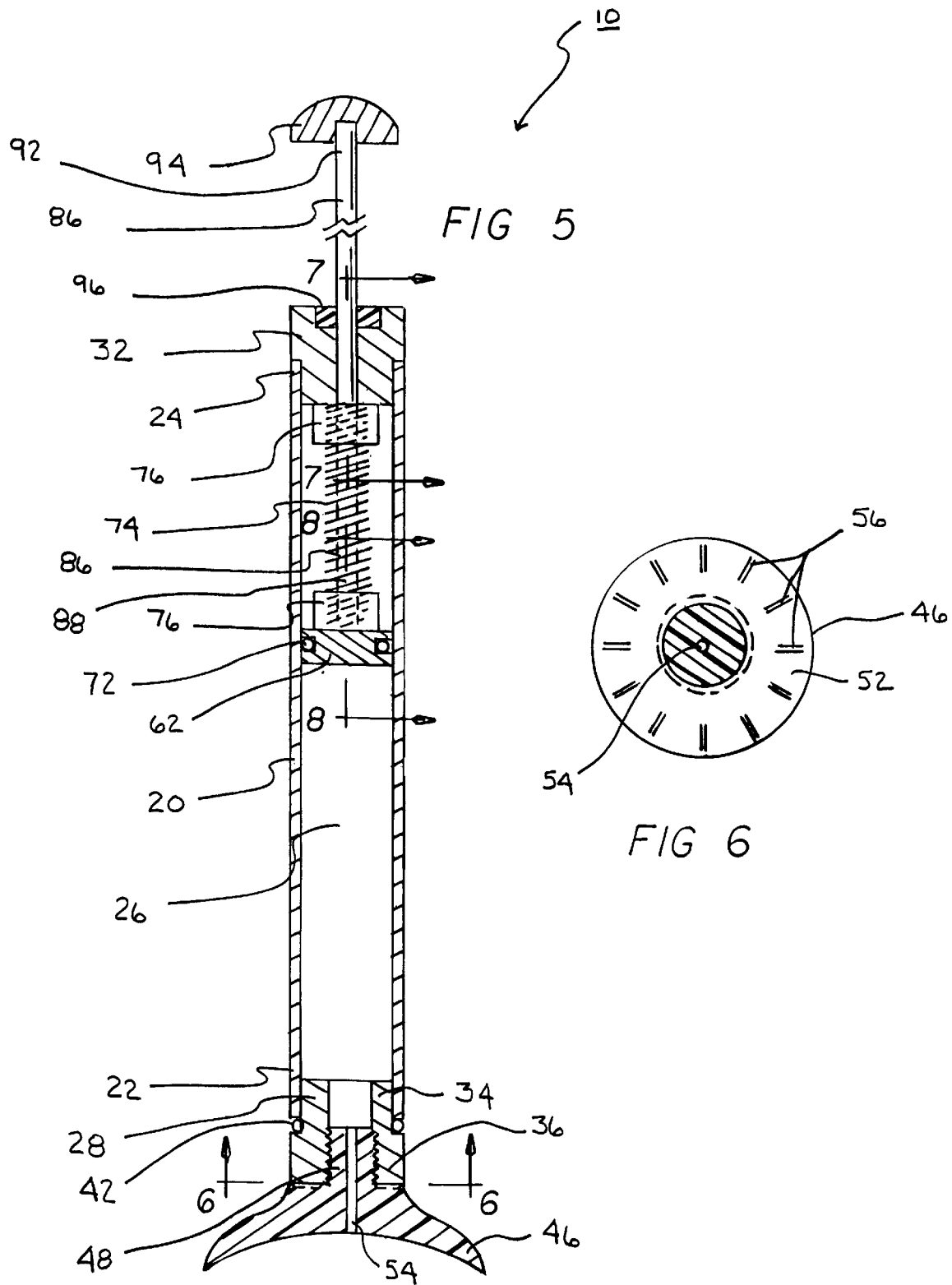

SUCTION OPERATED VALVE RESURFACING TOOL AND ASSOCIATED METHOD

BACKGROUND OF THE INVENTION

1. Field of the Invention

The present invention relates to a tool, and associated method, for valve resurfacing. More specifically, the present invention pertains to valve resurfacing tool which employs suction power.

2. Description of Related Art

Over time, the poppet valves which are employed in combustion engines lose their initial seating tolerances. As a consequence, such valves need to be resurfaced. Ideally, such resurfacing enables improved seating tolerances, and thus, improved engine performance. Broadly speaking, resurfacing tools can be categorized into three groups. A first group is specifically designed for resurfacing valve seats, as opposed to valve surfaces. Furthermore, a second group includes tools wherein the valve to be resurfaced remains stationary—with the resurfacing tool rotated about the valve face. Finally, a third group includes tools wherein valves are adapted to be driven over a grinding element.

Exemplary of the first group is U.S. Pat. No. 3,354,528 to Appleby. Appleby pertains to a cutter which is exclusively for use upon a valve seat. U.S. Pat. No. 4,637,762 to Acker illustrates the second category, wherein a tool is adapted to be positioned and rotated about a valve stem and seat. The third group is exemplified by Applicant's resurfacing tool described in U.S. Pat. No. 5,882,250. Such patent describes a tool with an inset portion adapted to engage and manipulate a valve to be resurfaced. Yet another example of this third category is Australian Patent 21,899 to Christie. Christie illustrates a resurfacing tool wherein the valve is adapted to be rotated over grinding elements by way of a screwdriver or similar implement.

What each of the above categories lacks, and what is cured by the resurfacing tool of the present invention, is a tool which can manipulate and resurface a valve without marring, or otherwise damaging, any of the valve surfaces. The present invention accomplishes this by providing a suction operated valve resurfacing tool.

BRIEF SUMMARY OF THE INVENTION

The general purpose of the present invention is to provide a tool and associated method for easily resurfacing both valves and their associated valve seats.

To attain this, the present invention essentially comprises a dynamic valve lapping tool for use in refacing valves and valve seats. The tool comprises a hollow handle having a forward end and a rearward end. The tool further comprises suction means which are in fluid communication with the interior of the hollow handle, wherein the suction means are secured to the forward end of the handle. The tool also includes a reciprocating assembly which is adapted for travel within the interior of the handle. The reciprocating assembly functions to selectively draw air into and expel air out of the suction means. Finally, a valve to be resurfaced is secured to the suction element.

It is therefore an object of the present invention to provide a valve resurfacing tool which attaches to an associated valve by way of suction.

It is another object of the present invention to provide a method whereby a valve seat and face can be simultaneously resurfaced through the use of a single tool.

It is a further object of the present invention to permit a resurfacing tool to be positively secured to the top of a valve without marring or damaging any of the associated valve surfaces.

An even further object of the present invention is to enable a user to effectively rotate a poppet valve in a balanced and stable manner to effect a uniform resurfacing of the valve face.

Even still another object of the present invention is to create a method whereby an operator can rotate and resurface a valve, and its associated housing, by hand, thereby giving such operator increased control over the pressure and speed with which the valve is repaired.

Lastly, it is an object of the present invention to provide a dynamic valve lapping tool for use in refacing valves and valve seats. The tool comprises a hollow cylindrical handle having a forward end and a rearward end, and an adapter having a stepped forward end and a rearward end, the adapter further including a threaded interior, an O-ring adapted to be positioned about the stepped forward end. The stepped forward end being positioned within the forward end of the handle. The tool further includes an elastomeric suction cup having a rearward threaded stud and a forward suction element. The suction element has a series of radially extending ribs formed upon an inner surface and a passageway extending through the entire length of the suction cup. The stud being threadably secured within the threaded interior of the adapter. A reciprocating assembly is included and adapted for linear travel within the interior of the handle for selectively drawing air into and expelling air out of the suction cup. Such assembly comprises a piston having a forward end and a rearward end, and a groove formed within the forward end. An o-ring is positioned within the groove of the piston, and the piston is positioned within the interior of the handle. An extension spring is secured to the rearward end of the piston by way of a crimp ring. Additionally, an end cap is secured over the rearward end of the handle, with the securement between the end cap and the handle being a press fit. The end cap has a forward, and rearward end and a central passageway. The forward end is interconnected to the extension spring by way of a second crimp ring. Furthermore, a piston rod is included and has a forward end secured to the end piston, and a rearward end with a button formed thereon. Additionally, the rod includes an intermediate extent positioned through the end cap and within the extension spring. The piston rod and button function to maneuver the reciprocating assembly within the handle. Lastly, a valve to be resurfaced is secured to the suction cup through a vacuum.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the suction operated valve resurfacing tool with the reciprocating element being depressed.

FIG. 2 is a side elevational view of the preferred embodiment with the reciprocating element being released.

FIG. 3 is a perspective view of the resurfacing tool constructed in accordance with the present invention.

FIG. 4 is a view taken along line 4—4 of FIG. 3.

FIG. 5 is a view taken along line 5—5 of FIG. 4.

FIG. 6 is a view taken along line 6—6 of FIG. 5.

The same reference numerals refer to the same parts throughout the various Figures.

DETAILED DESCRIPTION OF THE INVENTION

Figure 7:
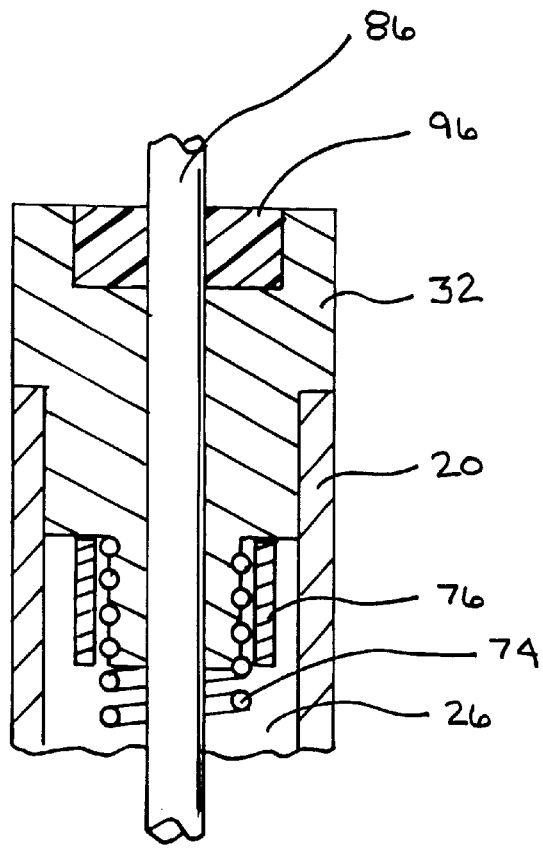
FIG. 7 is a view taken along line 7—7 of FIG. 5.

The present invention relates to a suction operated valve resurfacing, or lapping, tool and an associated method for its use. In general terms, the tool of the present invention includes a handle portion and a suction generating means. A reciprocating assembly is adapted for travel within the interior of the handle and functions in expelling air out of and drawing air into the handle. Through the use of the suction generating means, the tool can be positively secured to the upper surface of a valve. Thereafter, the entire tool can be rotated via the handle to facilitate the resurfacing of the valve seat. The various components of the tool of the present invention, and the manner in which they interrelate, will be described in more complete detail hereinafter. Additionally, the specific steps which make up the associated method will also be provided.

Tool Construction

The construction of the dynamic valve lapping tool 10 is illustrated with reference to FIGS. 1–8. The tool 10 is specifically adapted for use in refacing a valve 12 having a valve face 14 and seat 16. With specific reference to FIG. 5, a cross-sectional view of the tool 10 is provided. Such view depicts the hollow cylindrical handle 20 which forms the intermediate portion of the tool 10. The handle 20 is defined by forward and rearward ends (22 and 24 respectively), both of which are adapted to sealed the hollow interior 26 operation and use. In the preferred embodiment, the handle is 5 inches in length. As illustrated, the handle can have a knurled surface to assist a user in rotating the tool. Furthermore, the handle, as well as the other components of the tool, can be formed from aluminum. However, it is within the scope of the present invention to construct the tool from other materials such as plastic. An adapter 28 is provided for sealing the forward end 22, and an end cap 32 is provided for sealing and guiding the rearward end 24. The adapter 28 is fluid tight to permit a vacuum to be drawn within the interior 26 of the handle 20.

With continuing reference to FIG. 5, the construction of the adapter 28 is illustrated. The construction includes a stepped forward end 34, a rearward end 36, and a threaded interior 38. An O-ring 42 is employed in maintaining a fluid tight seal between the adapter 28 and the forward end 22 of the handle 20. To achieve this, the O-ring 42 is removably positioned about the stepped forward end 34 of the adapter. With the adapter 28 properly positioned, the stepped forward end 34 is positioned within the forward end 22 of the handle 20, and the O-ring 42 is compressed against the outer circumference of the handle 20.

The gripping power of the tool 10 is created by a suction generating means 44. The suction generating means 44 can be any type implement which enables the creation of a vacuum. Examples of suction generating means include, but are not limited to, suction devices such as suction cups, plungers or bells. Ideally, such suction generating means are formed from pliable materials, such as elastomers. The suction generating means 44 depicted in the Figures is a suction cup 46. Such suction cup 46 is defined by a rearward threaded stud 48 as well as a forward suction element 52. FIG. 5 also illustrates the air passageway 54 which extends through the entire length of the suction cup 54. When assembled, the stud 48 of the suction cup 46 is threadably secured within the threaded interior of the adapter 28. When so positioned, the air passage 54 of the suction cup allows for fluid communication into and out of the interior 26 of handle 20.

In the preferred embodiment, the suction element 52 further includes a series of radially extending ribs 56 formed upon an inner surface. These ribs 56 are illustrated with reference to FIG. 6. The ribs 56 function in preventing the suction cup 46 from losing its seal integrity when a vacuum is being drawn. Such loss of seal integrity is often referred to as "burping."

As can be appreciated from the drawings, air can be selectively drawn into and expelled from the interior 26 of the handle 20 by way of a reciprocating assembly 58. Such assembly 58 is specifically adapted for linear travel within the interior 26 of the handle 20 in a manner more fully described hereinafter.

The reciprocating assembly 58 includes a piston 62 which is adapted to ride within the interior 26 of the handle 20. The piston 62 is defined by forward and rearward ends (64 and 66 respectively), as well as by a groove 68 which is formed within the forward end 64. An O-ring 72 is positioned within the groove 68 of the piston 62. Consequently, when the piston 62 is positioned within the interior 26 of the handle 20 a fluid tight seal is formed in between the outer periphery of the piston 62 and an inner periphery of the handle 20.

Figure 8:
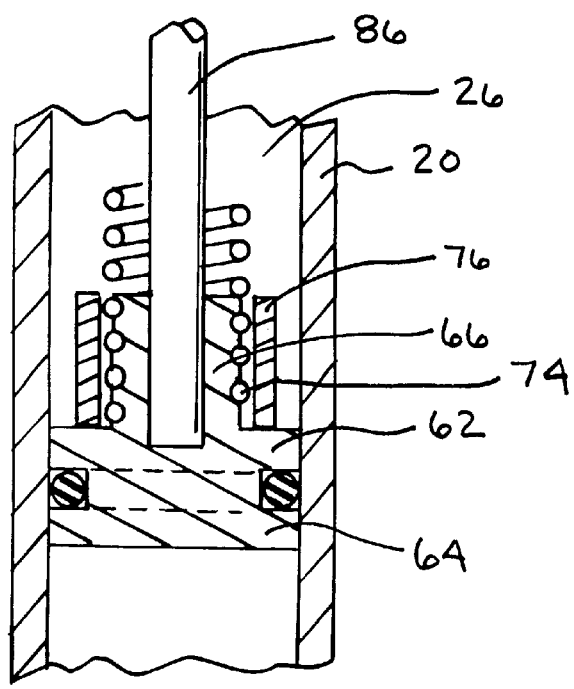
FIG. 8 is a view taken along line 8—8 of FIG. 5.

The reciprocating assembly 58 also includes an extension spring 74 which extends intermediate the piston 62 and end cap 32. The extension spring 74 is illustrated with reference to FIG. 5. The securement between the spring 74 and both the piston 62 and the end cap 32 is achieved by way of crimp rings 76. FIG. 8 is a detail illustrating the interconnection between the spring 74 and rearward end 66 of the piston 62. Similarly, FIG. 7 is a detail illustrating the interconnection between the spring 74 and the forward end 78 of the end cap 32. In both instances, the crimp ring 76 is deformed to secure a portion of the extension spring 74 to the underlying portion of the piston 62 or end cap 32.

With continuing reference to FIG. 7, the manner in which the end cap 32 is secured over the rearward end 24 of the handle 20 is depicted. The securement between the end cap 32 and the handle 20 is achieved via a friction fit. Furthermore, the end cap 32 is defined by forward 78 and rearward ends 82 and by a central passageway 84.

The reciprocation assembly 58 further includes a piston rod 86. The rod 86 is defined by a forward end 88 which is secured to the end of the piston 62, and a rearward end 92 with a button 94 formed thereon. The intermediate extent of the rod is positioned through the end cap 32 and within the extension spring 74. Additionally, a plastic insert 96 is employed as a bearing surface with sufficient clearance between the insert and rod 86 to provide free movement between the upper portion of the end cap 32 and the rod 86, note FIG. 7. The button 94 of the piston rod 86 permits a user to maneuver the reciprocating assembly 58 within the handle 20.

The extension spring 74 and rod 86 together serve to bias the entire reciprocation assembly 58 to a predetermined orientation. Specifically, in the absence of any user supplied force, the piston 62 is positioned at an intermediate location within the housing 20. This is the neutral position and is depicted in FIG. 5. A user can supply force to overcome the bias and thereby move the piston 62 downward from the neutral position. Moving the assembly downwardly causes air to be expelled from the interior 26 of the handle 20. Thereafter, releasing the assembly releases the tension created from the extension of the spring and causes air to be drawn into the handle 20. Thereafter, the assembly attempts to return to the original neutral position but is prevented due to the creation of a vacuum seal. The new neutral position is typically two thirds of the way down the length of the tool. However, this new neutral position will vary depending upon how much of a vacuum is being drawn. Ultimately, the vacuum created is constant and self compensating due to the presence of the spring. Furthermore, when the suction cup 46 is positioned on the valve the vacuum causes the tool to be positively secured to the valve. Thereafter, the tool is easily removed by depressing the plunger and thus forcing the air in the handle back through the suction cup.

Method of Employing the Tool

The method which can be practiced with the suction operated tool 10 of the present invention will next be described. The method contemplates providing a handle 20 defined by forward and rearward ends (222 and 24 respectively), and an intermediate extent therebetween. The next step involves providing a suction cup 46 with a periphery. The suction cup 46 preferably has a series of radially extending ribs 56 formed upon an inner surface, and a passageway 54 which extends through the entire length of the suction cup 46. As indicated hereinabove, the suction cup 46 is preferably connected to, and in fluid communication with, the interior 26 of the handle 20. Further provided is a reciprocating assembly 58 which is adapted for linear travel within the interior 26 of the handle 20. Such assembly selectively draws air into and expels air out of the suction cup 46.

Figures 9, 10:
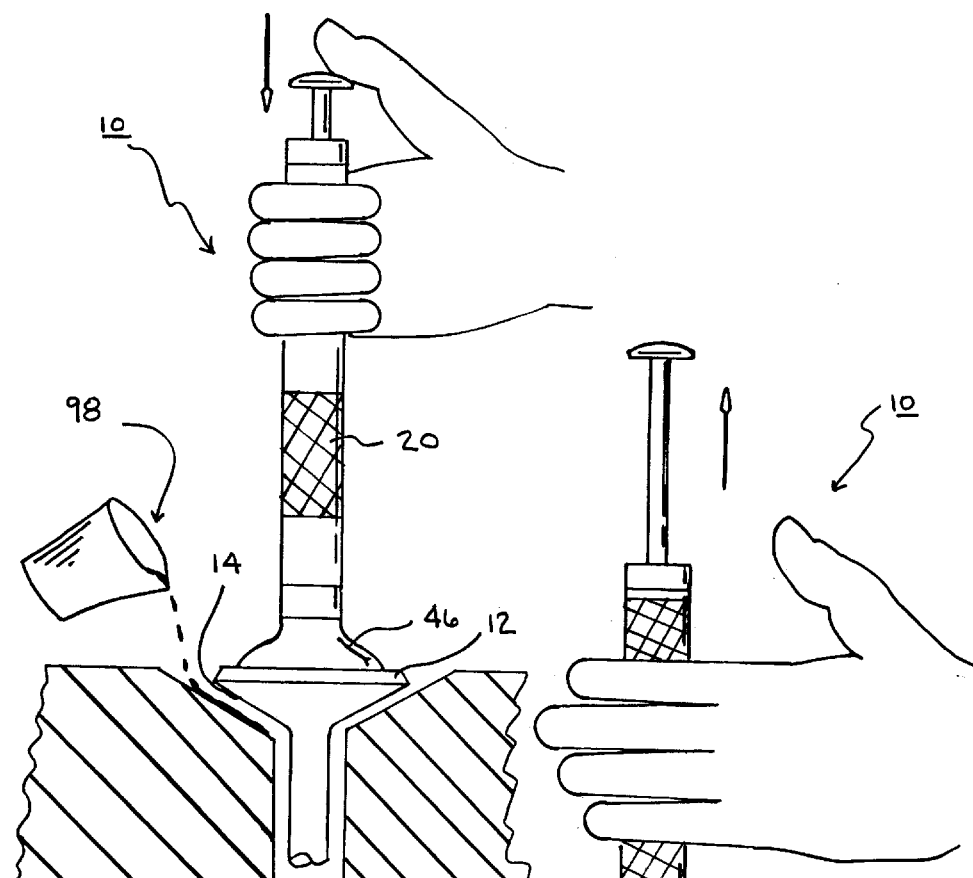
FIG. 9 is a side elevation view of the preferred embodiment in use.
FIG. 10 is a side elevation view of the preferred embodiment in use.

Next, the method of the present invention contemplates pushing the assembly 58 forward toward forward end 22 of the handle 20—thereby expelling air from the interior 26 of the handle 20. Thereafter, the suction cup 46 of the tool 10 is placed over the top of the valve to be resurfaced. Preferably, the suction cup 46 is positioned such that there are no gaps between the periphery of the suction cup 46 and the valve. In other words, an air tight seal is formed between the suction cup 46 and valve. Next, a vacuum is created in between the top of the valve and the suction cup 46 by allowing the retraction force from the spring to pull the reciprocating assembly 58 away from the forward end 22 of the handle 20. Thereafter, as illustrated in FIG. 9, an abrasive fluid 98 is applied to the face of the valve being treated. Such fluid 98 aids in resurfacing both the valve seat 16 and face 14 as the valve is rotated with the tool. The fluid can be a conventional abrasive or paste known in the industry. After the fluid 98 is applied, the valve is positioned by way of the suction cup 46 into its associated valve seat 16. Lastly, the handle is positioned in between the hands 102 of the user and rotated. Due to the interconnection between the suction cup 46 and handle 20, such rotation causes the rotation of the valve upon the valve seat 16. This rotation, in turn, causes the resurfacing of the valve seat 16 and face 14 due to the presence of abrasive fluid.

This detailed description has been provided only for illustrative purposes. It is recognized that other embodiments may be articulated without departing from the objects and scope of the present invention. Any such modifications and variations are meant to be within the scope of the invention as contained within the following claims.

What is claimed is:

1. A dynamic valve lapping tool for use in refacing valves and valve seats comprising:

a hollow cylindrical handle having a forward end and a rearward end;

an adapter having a stepped forward end and a rearward end, the adapter further including a threaded interior, an O-ring adapted to be positioned about the stepped forward end, the stepped forward end positioned within the forward end of the handle;

an elastomeric suction cup having a rearward threaded stud and a forward suction element, the suction element having a series of radially extending ribs formed upon an inner surface, an passageway extending through an entire length of the suction cup, the stud being threadably secured within the threaded interior of the adapter;

a reciprocating assembly adapted for linear travel within an interior of the handle for selectively drawing air into and expelling air out of the suction cup, the assembly comprising;

a piston having a forward end and a rearward end, a groove formed within the forward end, an o-ring positioned within the groove of the piston, the piston positioned within the interior of the handle;

an extension spring secured to the rearward end of the piston by way of a crimp ring;

an end cap secured over the rearward end of the handle, the securement between the end cap and the handle being a press fit, the end cap having a forward end and a rearward end and a central passageway, the forward end being interconnected to the extension spring by way of a second crimp ring;

a piston rod having a forward end secured to the end of the piston, a rearward end with a button formed thereon, and an intermediate extent positioned through the end cap and within the extension spring, the piston rod and button functioning to maneuver the reciprocating assembly within the handle;

a valve to be resurfaced secured to the suction cup through a vacuum.

2. A dynamic valve lapping tool for use in refacing valves and valve seats comprising:

a hollow handle having a forward end and a rearward end;

suction means in fluid communication with an interior of the hollow handle, the suction means being secured to the forward end of the handle;

a reciprocating assembly adapted for travel within the interior of the handle for selectively drawing air into and expelling air out of the suction means.

3. The tool as described in claim 2 further comprising a valve to be resurfaced secured to the suction means.

4. The tool as described in claim 2 wherein the reciprocating assembly comprises:

a piston positioned within the interior of the handle;

an extension spring secured to the piston;

an end cap secured to the rearward end of the handle, the end cap having a forward end and a central passageway, the forward end being interconnected to the extension spring;

a piston rod having a forward end secured to the piston, a rearward end with a button formed thereon, and an intermediate extent positioned through the end cap, the piston rod and button functioning to maneuver the reciprocating assembly within the handle.

5. The tool as described in claim 2 wherein the valve is secured to the suction means through a vacuum.

6. The tool as described in claim 2 wherein the suction means is a suction cup.

7. The tool as described in claim 6 wherein the suction cup includes a series of radially extending ribs formed upon an inner surface.

8. A method for resurfacing valves and valve seats comprising the following steps:

provic a handle having a forward end, a rearward end and an intermediate extent therebetween;

providing a suction cup with a periphery, the suction cup having a series of radially extending ribs formed upon an inner surface, and a passageway extending through an entire length of the suction cup, the suction cup being connected to and in fluid communication with an interior of the handle;

providing a reciprocating assembly adapted for linear travel within the interior of the handle for selectively drawing air into and expelling air out of the suction cup;

pushing the reciprocating assembly toward the rearward end of the handle to expel air from the interior of the handle;

placing the suction cup over a top of a valve having a face to be resurfaced such that there are no gaps between the periphery of the suction cup and the valve;

creating a vacuum in between the top of the valve and the suction cup by a spring force pulling the reciprocating assembly away from the forward end of the handle;

applying an abrasive fluid to the face of the valve;

rotating the handle in between a pair of hands, such rotation causing the rotation of the valve upon a valve seat.

9. A method for resurfacing valves and valve seats comprising the following steps:

providing a handle having a forward end, a rearward end and an intermediate extent therebetween;

providing a suction generating means which is connected to and in fluid communication with an interior of the handle;

providing a reciprocating assembly adapted for linear travel within the interior of the handle;

pushing the reciprocating assembly toward the forward end of the handle;

placing the suction generating means over a top of a valve and releasing the reciprocating assembly;

creating a vacuum in between the top of the valve and the suction generating means by allowing a force a the spring to reciprocate the reciprocating assembly away from the forward end of the handle.

10. The method as described in claim 9 further comprising the following steps:

applying an abrasive fluid to a face of the valve; and positioning the valve by way of the suction generating means into a valve seat.

11. The method as described in claim 10 further comprising the step of rotating the handle in between a pair of hands, such rotation causing the rotation of the valve upon the valve seat.

* * * * *